(12) United States Patent
Houston et al.

(10) Patent No.: US 7,506,453 B2
(45) Date of Patent: Mar. 24, 2009

(54) METHOD AND APPARATUS FOR ORIENTING A HAND TOOL

(75) Inventors: John S. Houston, Hopewell Junction, NY (US); William B. Huber, Somers, NY (US); Carl Mickla, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 11/424,898

(22) Filed: Jun. 19, 2006

(65) Prior Publication Data

US 2007/0289153 A1    Dec. 20, 2007

(51) Int. Cl.
*B23B 45/14* (2006.01)
*G01C 9/00* (2006.01)

(52) U.S. Cl. ..................................... 33/334; 33/366.24

(58) Field of Classification Search .......... 33/333–334, 33/366.11, 366.12, 366.15, 366.16, 366.17, 33/366.23, 366.24, 366.27
See application file for complete search history.

(56) References Cited

U.S. PATENT DOCUMENTS

| 1,611,886 | A |   | 6/1926  | Champlin |
| 2,600,363 | A | * | 6/1952  | Morris ......................... 33/334 |
| 3,540,122 | A |   | 11/1970 | Bogdan |
| 3,885,306 | A |   | 5/1975  | Herman |
| 3,971,273 | A |   | 7/1976  | Peters et al. |
| 4,182,046 | A | * | 1/1980  | Ludlow et al. ........... 33/366.16 |
| 4,189,726 | A | * | 2/1980  | Rosa et al. ..................... 33/334 |
| 4,295,279 | A |   | 10/1981 | Sienknecht |
| 4,402,141 | A | * | 9/1983  | Sterrenberg .................. 33/334 |
| 4,785,544 | A | * | 11/1988 | Heinsius et al. ............... 33/334 |
| 5,467,532 | A |   | 11/1995 | Ames |
| 5,562,240 | A | * | 10/1996 | Campbell .................... 227/130 |
| 6,125,857 | A |   | 10/2000 | Silber |
| 6,236,001 | B1 |   | 5/2001 | Shymko |
| 6,281,456 | B1 | * | 8/2001 | Ogden ...................... 33/366.11 |
| 6,565,227 | B1 | * | 5/2003 | Davis ......................... 362/119 |
| 6,692,200 | B2 | * | 2/2004 | Peterson ..................... 408/1 R |
| 6,694,631 | B2 | * | 2/2004 | Bone et al. ..................... 33/333 |
| 6,851,487 | B1 | * | 2/2005 | Shotey ........................... 173/1 |
| 6,880,258 | B2 |   | 4/2005 | Adams et al. |
| 6,898,860 | B2 | * | 5/2005 | Wu ................................ 33/286 |
| 7,150,587 | B2 | * | 12/2006 | Dils et al. ..................... 33/334 |
| 7,182,148 | B1 | * | 2/2007 | Szieff ...................... 33/366.14 |
| 7,331,113 | B1 | * | 2/2008 | Patrick et al. ................. 33/286 |
| 2004/0083616 | A1 |   | 5/2004 | Hamar |
| 2004/0139615 | A1 |   | 7/2004 | Gianatasio |
| 2006/0139618 | A1 | * | 6/2006 | Pando ....................... 356/4.01 |

FOREIGN PATENT DOCUMENTS

JP           8187371 A        7/1996

* cited by examiner

*Primary Examiner*—Yaritza Guadalupe-McCall
(74) *Attorney, Agent, or Firm*—Cantor Colburn LLP; William Kinnaman, Jr.

(57) ABSTRACT

Disclosed herein is a device that relates to orientation of a hand tool. The device comprising, a housing of the orientation device, at least one direction sensor attached to the housing, at least one alarm in operable communication with the at least one direction sensor. The alarm configured for transmitting an alert in response to the at least one direction sensor sensing a direction beyond at least one preset direction limit, and a clamp for releasably attaching the device to a hand tool.

11 Claims, 6 Drawing Sheets

METHOD AND APPARATUS FOR ORIENTING A HAND TOOL

BACKGROUND OF THE INVENTION

Maintaining a consistent orientation of a hand tool during its use is often desirable to achieve the results an operator of the hand tool is seeking. Toward this end, several products have been developed to assist the operator during the use of the hand tool. In the case of a saw as the hand tool, for example, it is common to use a fixture to guide the blade of the saw during the cutting process to prevent deviating from the desired cutting direction. These guides often limit the size of the work piece being cut and sometimes even limit several dimensional characteristics of the saw itself. As a result of these limitations the device may not be used as universally as would often be desired.

Similar devices have been developed for controlling the orientation of cuts made with a knife. Such devices guide the blade of the knife as well as guide the work piece during the cutting operation. These devices are often designed to be used with a specific work piece, such as a loaf of bread or a bagel for example, and are therefore not universally adaptable. Additionally, these devices typically do not allow for operating the hand tool at angles other than vertically straight downward. Further, these devices tend to be bulky, malting use with and storage of them difficult.

Other, more universally adaptable, products have been developed that incorporate a level with a bubble, for example, to assist the operator in orientation of the hand tool during use. Such devices however require significant dexterity, by the operator, to be able to watch the level, the work piece and the hand tool simultaneously while operating the hand tool. Such a product, therefore, is not well adapted to individuals with mobility impairments or those who are visually impaired.

Accordingly there is a need in the art for a hand tool orientation device that is easy to handle and may be used with a wide variety of hand tools while not placing undue restrictions on the dimensional characteristics of the work piece. There is a further need for a device that does not place undue demand on the visual and manual dexterity of the operator.

BRIEF DESCRIPTION OF THE INVENTION

Disclosed herein is a device that relates to orientation of a hand tool. The device comprising, a housing of the orientation device, at least one direction sensor attached to the housing, at least one alarm in operable communication with the at least one direction sensor. The alarm configured for transmitting an alert in response to the at least one direction sensor sensing a direction beyond at least one preset direction limit, and a clamp for releasably attaching the device to a hand tool.

Further disclosed herein is a method that relates to orienting a hand tool. The method comprising, attaching at least one direction sensor to the hand tool, sensing a direction of a physical parameter with the at least one direction sensor, and transmitting an alert in response to the at least one direction sensor sensing a direction exceeding a preset direction limit.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Releasably mounting a direction sensing orientation device, for example a device that senses the direction of gravity, to a hand tool such as a knife may provide an operator of the hand tool with live visual and/or audio feedback when the tool is tilted at an angle relative to gravity at more than a preset angle. Such feedback may be helpful to persons with problems of hand-eye coordination, for example, as well as for those with vision problems.

Figure 1:
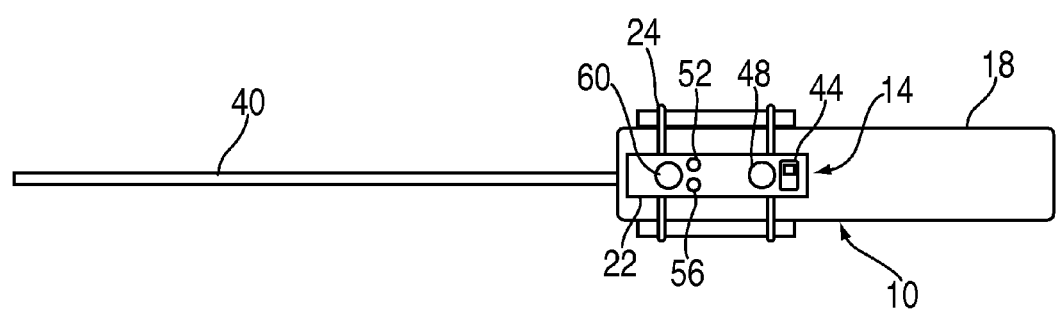
FIG. 1 depicts a top view of a knife with the orientation device disclosed herein attached thereon.
Figure 2:
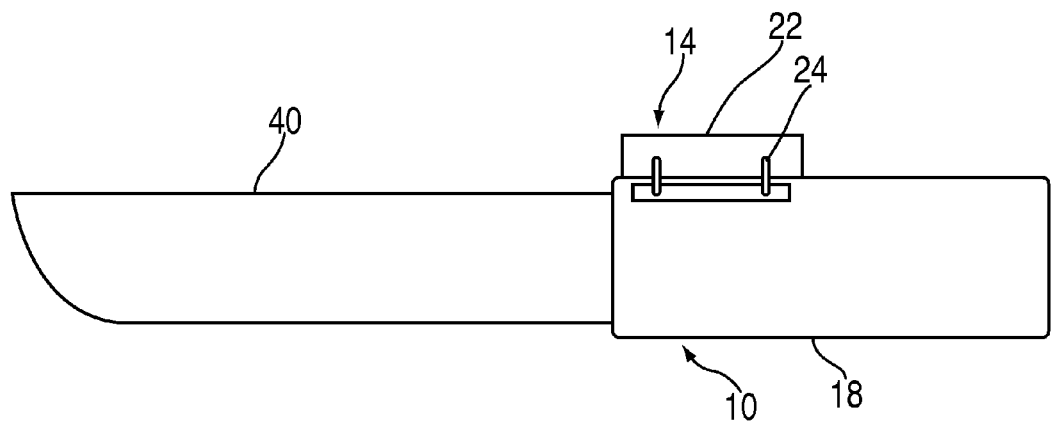
FIG. 2 depicts a side view of the knife and orientation device depicted in FIG. 1.
Figure 3:
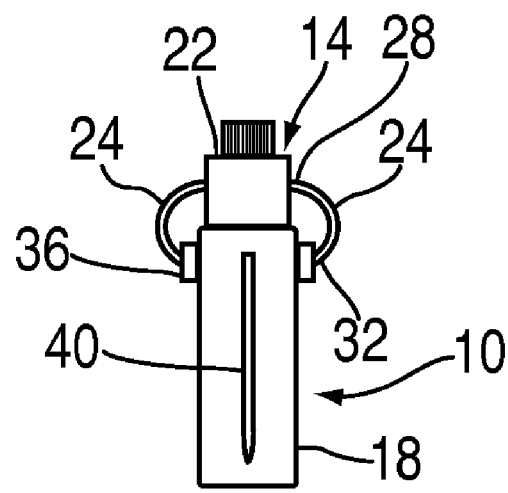
FIG. 3 depicts an end view of the knife and orientation device depicted in FIG. 1.

Referring to FIGS. 1-3, a hand tool 10, depicted herein as a knife, is shown with an orientation device 14 releasably attached to the handle 18 of the hand tool 10. The orientation device 14 has a housing 22 and two pairs of biasing members 24, depicted herein as springs, attached thereon. The biasing members 24 each have a first end 28 and a second end 32. The first ends 28 of the biasing members 24 are fixedly attached to the housing 22, while the second ends 32 are optionally attached to shoes 36 or are directly loaded against opposing sides of the handle 18. The biasing members 24 create a substantially symmetrical load on opposing sides of the handle 18, thereby forming a clamp for frictionally mounting the orientation device 14 to the hand tool 10. The purpose for the optional shoes 36 is to distribute the load of the biasing members 24 over a larger area of the hand tool 10 and to provide a surface for attaching materials with higher friction if so desired. It should be noted that the biasing members 24 are only one embodiment of a releasable clamp for attachment to a hand tool 10 and that alternate embodiments could also be employed while staying within the spirit and scope of the present invention.

The foregoing described frictional engagement between the orientation device 14 and the hand tool 10 provides for a releasable mounting of the orientation device 14 to the hand tool 10. The ability to remove the orientation device 14 from the hand tool 10 makes it more versatile since the orientation device 14 may be releasably attached to other hand tools 10 as well such as to a saw or drill for example. Additionally, the orientation device 14 may be removed from the hand tool 10 to facilitate cleaning of the hand tool 10 without having to clean around the orientation device 14. This separation may be particularly desirable for cleaning of the hand tool 10 in a dishwasher for example.

Figure 4:
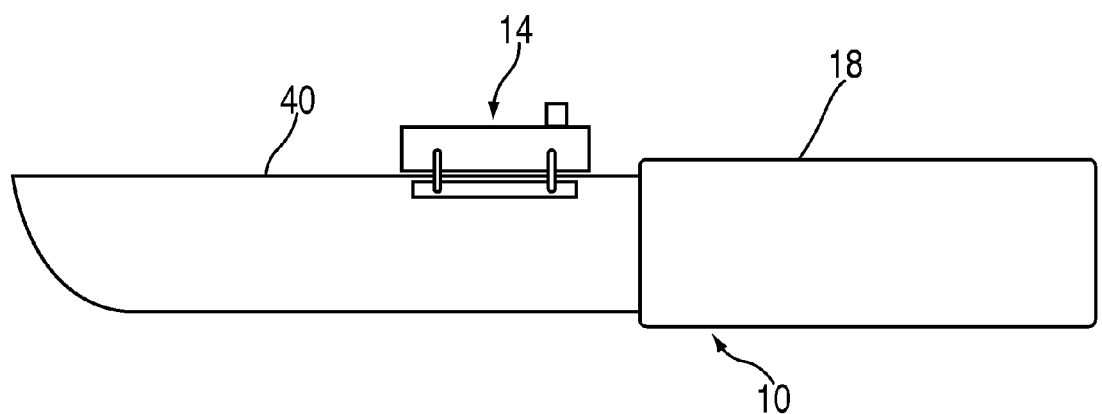
FIG. 4 depicts a side view of a knife with the orientation device disclosed herein attached thereon in an alternate location.

Another advantage provided by the flexibility of the biasing members 24 is the adaptability they provide for mounting the orientation device 14 to hand tools 10 with different handle 18 thicknesses. Further, this same adaptability allows the orientation device 14 to be mounted to alternate locations on a single hand tool 10. Referring now to FIG. 4, the orientation device 14 is shown mounted to a blade 40 of the same hand tool 10, the knife, depicted in FIGS. 1-3. The blade 40 is much thinner than the handle 18, however the biasing members 24 have sufficient flexibility to permit a frictional engagement with either the handle 18 or the blade 40.

Referring again to FIG. 1, wherein the orientation device 14 is attached to the handle 18 of the hand tool 10, the features of the orientation device 14 can be seen in detail. A simple laterally actuated On/Off switch 44 is positioned towards one end of the orientation device 14. Adjacent to the On/Off switch 44 is a rotatable sensitivity knob 48, the function of which will be described in detail in reference to FIGS. 5 and 6 below. Further along the housing 22 is a pair of lights 52, 56, which may include light emitting diodes (LED), incandescent lamps or any other switchable source of illumination. The lights 52, 56 form an alarm that may provide a visual alert to an operator of the hand tool 10 in response to the hand tool being tilted beyond a preset tilt angle. Having two lights 52 and 56 provides the option of supplying the direction of tilt based upon which of the lights 52, 56 has been illuminated. Using different colors for the two lights 52, 56 may provide the direction of tilt without having to focus on which light 52, 56 has actually illuminated. The last feature positioned along the housing 22 is a speaker 60. The speaker 60 forms an alarm that provides an audible alert to an operator of the hand tool 10 in response to the hand tool being tilted beyond a preset tilt angle. The speaker 60 could produce different sounds depending upon the direction of tilt.

Figure 5:
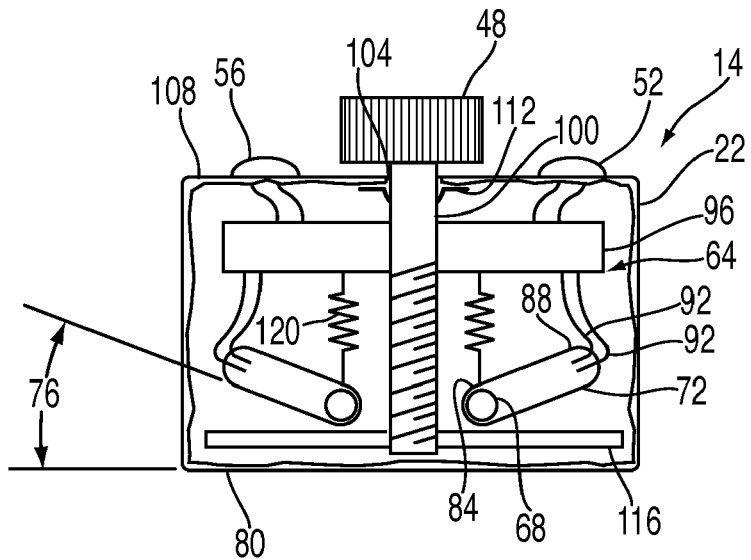
FIG. 5 depicts a partial internal view of the orientation device disclosed herein.

Referring to FIG. 5, an excessive tilt angle of the orientation device 14 is sensed by a direction sensor 64, which in this embodiment senses the direction of gravity, located within the housing 22 and fixedly attached to the housing 22. The gravity direction sensor 64 completes a circuit that triggers or energizes an alarm in response to the gravity direction sensor 64 sensing a direction of gravity, also referred to as tilt, being beyond a preset limit. The gravity direction sensor 64 incorporates a pair of conductive masses 68, such as metal spheres or masses of liquid mercury, for example, to complete the circuit. Each of the masses 68 is contained within a holder 72 that is positioned at an angle 76 relative to the bottom 80 of the housing 22. The masses 68 reside at a first end 84 of the holder 72 when the alarm of the orientation sensor 14 is not actuated. When either of the masses 68 travels to a second end 88 of their respective holders 72, the mass 68 will contact a pair of terminals 92 thereby completing the circuit.

The pair of terminals 92 is electrically connected to a circuit board 96 that is electrically connected to the lights 52, 56, the speaker 60 and a battery (not shown). Through a simple circuit, on the circuit board 96, the completion of the circuit created by the mass 68 contacting the terminals 92 can be made to energize either of the lights 52, 56 or the speaker 60 or any combination of the three simultaneously. The alarm resulting from energizing at least one of the lights 52, 56 or the speaker 60 will alert the operator that the tilt angle of the hand tool 10 has exceeded the preset level.

The sensitivity of the preset tilt angle may be adjusted by tuning the sensitivity knob 48. The sensitivity knob 48 is attached to a threaded shaft 100 that extends through a hole 104 of the cover 108 of the housing 22. A retainer 112 fixed to the threaded shaft 100, within the housing 22, positions the knob 48 in close proximity to the cover 108 at all times, regardless of rotation of the knob 48. The threaded shaft 100 threadably engages a plate 116 positioned near the bottom 80 of the housing 22. Rotation of the plate 116, within the housing 22, is prevented by details within the housing 22, that are not shown, such that rotation of the threaded shaft 100 results in the plate 116 moving along the threaded shaft 100 in directions towards or away from the bottom 80 depending upon the direction that the shaft 100 is rotated. Thus, rotation of the knob 48 results in the plate 116 moving towards or away from the bottom 80.

It is this movement of the plate 116 that causes changes in sensitivity of the orientation device 14. The first ends 84 of the holders 72 are biased towards the plate 116 by compression springs 120, while the second ends 88 of the holders are pivotally attached to the housing 22 by a structure not shown. Thus movement of the plate 116 causes the first ends 84 of the holders 72 to pivot about their second ends 88 changing the angle 76 in the process. The greater the angle 76 the less sensitivity the orientation device 14 has. Alternatively, the less the angle 76, the more sensitive the orientation device 14 is and the less tilt required before the alarm is energized. For example, if the angle 76 were set to one degree, the orientation device 14 would only be allowed to tilt plus or minus one degree before the alarm would be energized.

Figure 6:
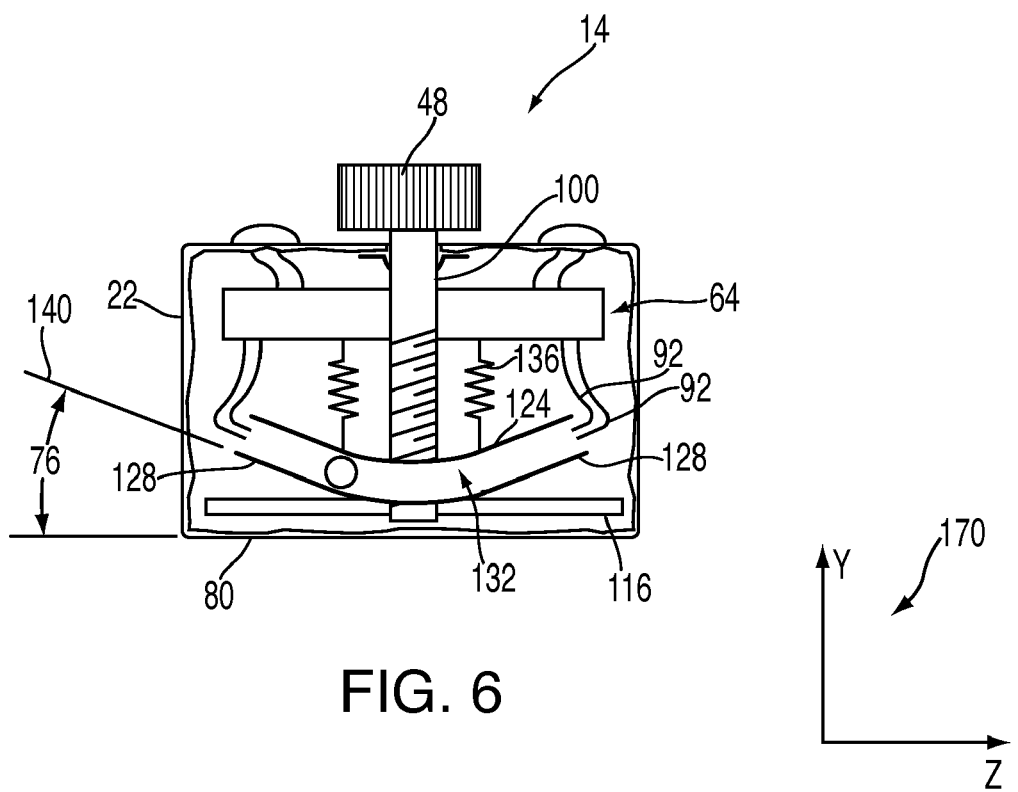
FIG. 6 depicts a partial internal view of an alternate embodiment of the orientation device disclosed herein.

Referring to FIG. 6, an alternate embodiment of the orientation device 14 to that of FIG. 5 is depicted. Instead of using two metal masses 68 only one metal mass 68 is used to complete either of the two circuits by making contact with terminals 92. The mass 68 is able to move within a flexible tube 124 that has a curved shape. Opposing ends 128 of the tube 124 are supported within the housing 22 by supports (not shown), while the central portion 132 of the tube 124 is biased towards the plate 116. The bias of the springs 136 cause the central portion 132 of the tube 124 to remain in contact with the bottom 80 of the housing 22 at all times. Adjustment of the sensitivity of the orientation device 14 is again controlled by the sensitivity knob 48 that causes the plate 116 to move towards or away from the bottom 80 in response to turning of the knob 48 and subsequent rotation of the threaded shaft 100 attached thereto. Movement of the plate 116 causes movement of the central portion 132 of the tube 124 that causes a change in the angle 76 formed between the bottom 80 and a tangent line 140, which is tangent to the tube 124 at the ends 128. The smaller the angle 76 the more sensitive the orientation device 14 is.

With the foregoing structure an operator may utilize the hand tool orientation device 14 by attaching it to the hand tool 10 and turning the orientation device 14 on with the On/Off switch 44. Once turned on the orientation device 14 will sound an audible alert through the speaker 60 and illuminate the light 52, 56 whenever the hand tool 10 is tilted beyond a preset angle 76 relative to the direction of gravity. The preset angle 76, or sensitivity, may be adjusted by turning the sensitivity knob 48. Turning the knob 48 in one direction, clockwise for example, will cause the sensitivity to increase and the present angle 76 to decrease, while rotation of the knob 48 in the opposite direction, counterclockwise, will cause the sensitivity to decrease and the preset angle 76 to increase. It should be noted that the holder 72 and the tube 124 in the foregoing embodiments are positioned laterally relative to the orientation device 14 and therefore allow actuation of the orientation device 14 only in response to changes in lateral angles of orientation. However, other embodiments could have alternate orientations of holders 72 and tubes 124 thereby permitting alerting of excessive tilting in other directions without deviating from the spirit and scope of the present invention.

The foregoing embodiments each contain two separate tilt indicating circuits. The first circuit for detecting tilts in one direction and the second circuit for detecting tilts in the opposite direction. Having these two independent circuits allows the device to indicate the direction of the tilt when the alarm is energized. For the audible alarm this involves creating a different sound for each direction of tilt. For the illuminated alarm this involves illuminating one light 52 for one direction of tilt and the other light 56 for the other direction of tilt. Additionally a different color light 52, 56 could be illuminated for each direction of tilt. This last method can even be accomplished with a single LED that has the ability to illuminate with different colors.

Figure 7:
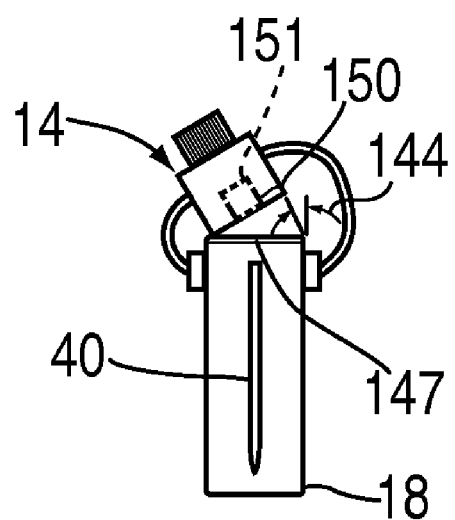
FIG. 7 depicts an end view of a knife and orientation device with the orientation device mounted in an alternate manner as disclosed herein.

Referring to FIG. 7, an alternate mounting of the orientation device 14 to the hand tool 10 permits the hand tool 10 to be used at a defined angle 144 relative to the direction of gravity. A wedge 147 is attached to the orientation device 14 with a mortise 150 and tenon 151 joint thereby positionally locking the wedge 147 to the orientation device 14. The flexible biasing members 24 allow the wedge 147 and orientation device 14 together to be releasably mounted to the hand tool 10. The defined angle 144 is then the central angle in which the hand tool 10 will be oriented relative to angles at which alarms will be energized. If, for example, the wedge 147 has a defined angle 144 of 45 degrees, then the blade 40 will have a nominal angle of 45 degrees when being operated. If the sensitivity is set at plus or minus two degrees, then the alarm will be energized when the blade 40 is moved to either 43 degrees or less or to 47 degrees or more.

Figure 8:
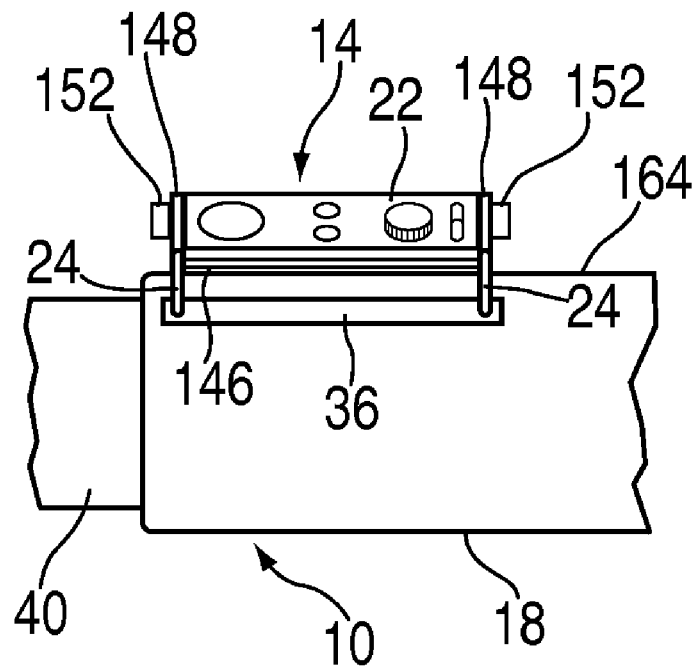
FIG. 8 depicts a side view of a knife and orientation device with the orientation device mounted in yet another alternate manner as disclosed herein.
Figure 9:
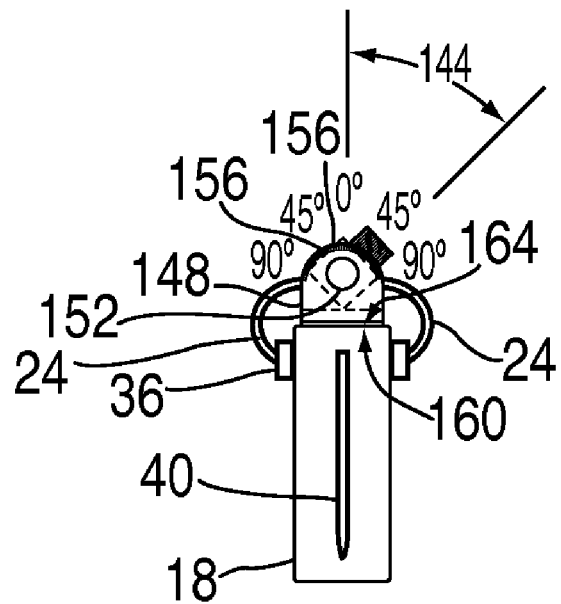
FIG. 9 depicts an end view of the knife and orientation device depicted in FIG. 8.

Referring to FIGS. 8 and 9, an alternate embodiment for setting a defined angle 144 is depicted. The orientation device 14 is rotationally lockable relative to a bracket 146, which has a pair of end plates 148 to which the orientation device 14 is attached via lock screws 152. The lock screws 152 are threadably engaged to the housing 22 through holes in the end plates 148 to frictionally lock the housing 22 to the end plates in a variety of relative rotational positions. The transparent end plates 148 include angular calibration marks 156 along an outer radius to facilitate alignment of the center of the housing 22 to preferred defined angles 144. A flat surface 160 on the bracket 146 may sit parallel to and abut against a surface 164 of the handle 18 to establish alignment of the zero degree calibration mark 156 with the blade 40 of the hand tool 10. The end plates 148 have the biasing members 24 attached thereto to facilitate releasable attachment of the bracket 146 to the handle 18.

The foregoing structure enables the orientation device 14 to be mounted to a hand tool 10 and then rotationally fixed at a defined angle 144 relative to the hand tool 10. This angle may be set to any angle from minus 90 degrees to plus 90 degrees for example, which would allow an operator accurately use the hand tool 10 with the blade 40 positioned horizontally, vertically or at any angle in-between.

Figure 10:
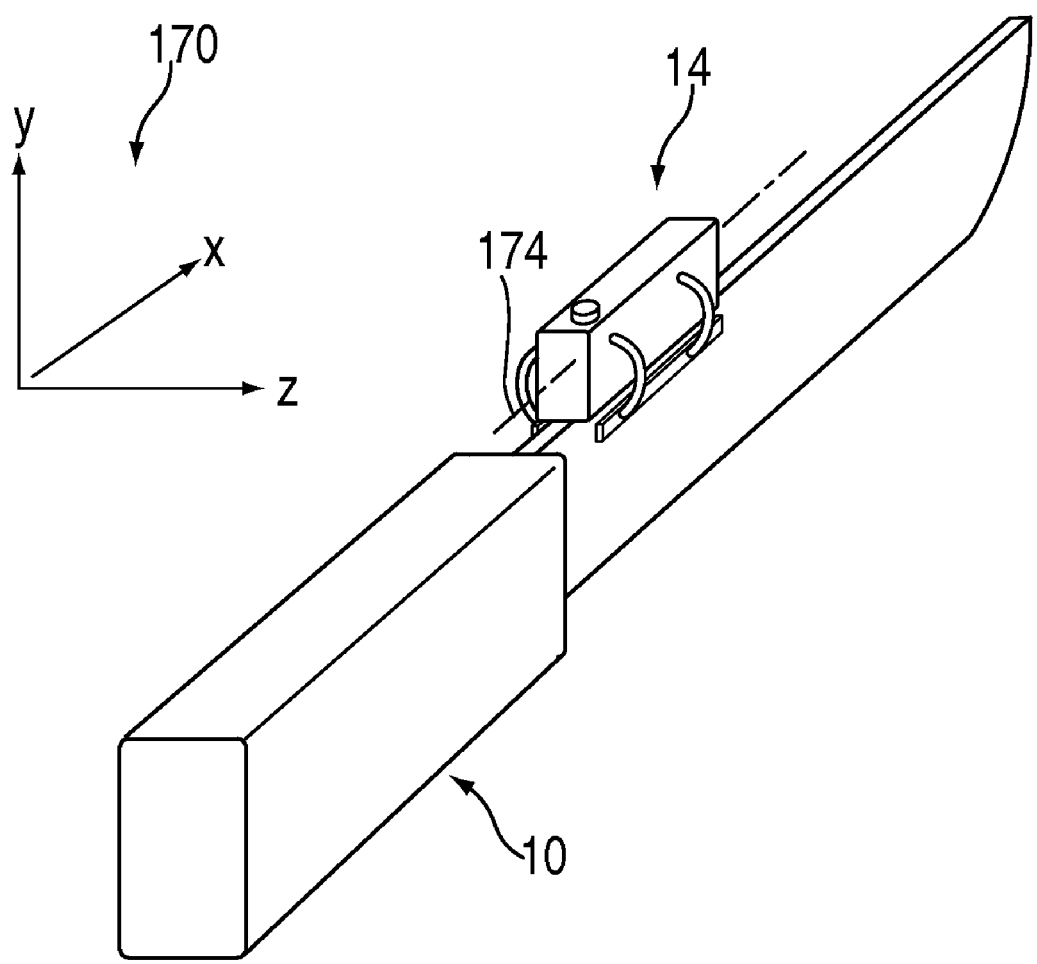
FIG. 10 depicts a perspective view of the knife and orientation device of FIG. 1.

Referring to FIG. 10, a perspective view of the knife 10 and the orientation device 14 is depicted. A Cartesian coordinate system 170 is positioned with the X-axis of the coordinate system 170 aligned parallel to a rotational axis 174 of the orientation device 14 that is controlled by the orientation device 14. This is also shown in FIG. 6 where the coordinate system 170 is shown relative to the cross sectional view of the gravity direction sensor 64. In FIG. 6 it can be seen how rotation about the X-axis results in activation of the gravity direction sensor 64, while rotation about either the Y-axis or the Z-axis does not result in activation of the gravity direction sensor 64. If the orientation device 14 were mounted to the hand tool 10 in an orientation of 90 degrees to that currently shown, that is with the rotational axis 174 oriented parallel to the Z-axis, the orientation device 14 would then control rotational movement of the hand tool 10 about the Z-axis and not about the X-axis. This may be described as one directional control.

Two directional control may be provided by adding a second gravity direction sensor 64 to the orientation device 14, for example. If a first gravity direction sensor 64 is aligned parallel to the X-axis and a second gravity direction sensor is aligned parallel to the Z-axis, the orientation device 14 would activate alarms in response to rotation about either the X-axis or the Z-axis. This may be described as two directional control. In this scenario, rotation about the Y-axis would still be permitted without activation of alarms of the orientation device 14. Adding a third directional control to the orientation device 14 requires an alternate direction sensor to be used than the gravity direction sensor 64.

It should therefore be understood that the direction sensor may sense the direction of various other physical parameters, besides gravity, while still remaining within the spirit and scope of the present invention. For example, the following is only a partial list of other possible direction sensors that could be employed; a magnetic field direction sensor, an earth's magnetic field direction sensor, an electric field direction sensor, a wind direction sensor, a light orientation sensor, and a sound source direction sensor. Basically any force, gradient, field or other parameter that has a direction associated with it and can be sensed and determined, could be sensed by a direction sensor of an embodiment of the present invention.

Thus, a plurality of direction sensors may be employed into a single orientation device 14. The plurality of direction sensors may sense the direction of different physical parameters all within a single orientation device 14 also. In so doing, an orientation device may have two or more directional control in a single device.

Embodiments of the invention may have some of the following advantages: audibly and/or visually alert operator of hand tool use at orientations outside a desired directional range, adjustable nominal tool orientation settings, adjustable alarm sensitivity settings, and adjustable angular tolerance for which alarms are set.

While the embodiments of the disclosed method and apparatus have been described with reference to exemplary embodiments, it will be understood by those skilled in the art that various changes may be made and equivalents may be substituted for elements thereof without departing from the scope of the embodiments of the disclosed method and apparatus. In addition, many modifications may be made to adapt a particular situation or material to the teachings of the embodiments of the disclosed method and apparatus without departing from the essential scope thereof. Therefore, it is intended that the embodiments of the disclosed method and apparatus not be limited to the particular embodiments disclosed as the best mode contemplated for carrying out the embodiments of the disclosed method and apparatus, but that the embodiments of the disclosed method and apparatus will include all embodiments falling within the scope of the appended claims.

What is claimed is:

1. A hand tool orientation device, comprising:

a housing of the orientation device;

at least one direction sensor attached to the housing;

at least one alarm in operable communication with the at least one direction sensor, for transmitting an alert in response to the at least one direction sensor sensing a direction beyond at least one selectable direction limit;

a clamp for releasably attaching the device to a hand tool; and a knob in operable communication with the at least one direction sensor such that rotation of the knob alters the selectable direction limit;
a threaded shaft in operable communication with the knob such that rotation of the knob causes rotation of the threaded shaft;
a plate in operable communication with the threaded shaft such that rotation of the threaded shaft causes the plate to move along the threaded shaft thereby altering an angle of actuation of the at least one direction sensor; and
at least one tubular member in operable communication with the plate such that movement of the plate causes deformation of the at least one tubular member.

2. The hand tool orientation device of claim 1, wherein:
at least one of the at least one direction sensor senses the direction of gravity.

3. The hand tool orientation device of claim 2, wherein:
the gravity direction sensor has a mass that moves relative to the housing in response to the housing rotating relative to the direction of gravity.

4. The hand tool orientation device of claim 3, wherein:
the mass is electrically conductive.

5. The hand tool orientation device of claim 4, wherein:
the mass is a metal sphere.

6. The hand tool orientation device of claim 1, wherein:
the at least one alarm has at least one light for transmitting a visual alert.

7. The hand tool orientation device of claim 6, wherein:
the at least one light is configured to produce a different color depending upon which preset direction limit is exceeded.

8. The hand tool orientation device of claim 6, wherein:
the at least one alarm has a first light for transmitting a visual alert indicating a first preset direction limit has been exceeded, and a second light for transmitting a visual alert indicating a second preset direction limit has been exceeded.

9. The hand tool orientation device of claim 1, wherein:
the at least one alarm has at least one speaker for transmitting an audible alert.

10. The hand tool orientation device of claim 1, wherein:
the orientation device has an adjustable sensitivity.

11. The hand tool orientation device of claim 1, further comprising at least one conductive element moveable within the tubular member in response to orientation of the tubular member relative to a direction of gravity.

* * * * *